United States Patent [19]

Schaaf

[11] Patent Number: 5,567,463
[45] Date of Patent: Oct. 22, 1996

[54] COOKER-EXTRUDER APPARATUS AND PROCESS FOR COOKING-EXTRUSION OF BIOPOLYMERS

[75] Inventor: Heinz Schaaf, Bad Camberg, Germany

[73] Assignee: Schaaf Technologie GmbH, Bad Camberg, Germany

[21] Appl. No.: 407,004

[22] PCT Filed: Jul. 20, 1994

[86] PCT No.: PCT/EP94/02402

§ 371 Date: Mar. 29, 1995

§ 102(e) Date: Mar. 29, 1995

[87] PCT Pub. No.: WO95/03714

PCT Pub. Date: Feb. 9, 1995

[30] Foreign Application Priority Data

Jul. 29, 1993 [DE] Germany ............................ 43 25 514.0

[51] Int. Cl.$^6$ .................................. A23L 1/00; A23P 1/00
[52] U.S. Cl. ............................. 426/523; 99/348; 366/87; 425/197; 425/199; 426/448; 426/516
[58] Field of Search ..................................... 426/448, 516, 426/519, 523; 425/197, 198, 199; 99/348, 353; 366/87, 79

[56] References Cited

U.S. PATENT DOCUMENTS

| | | | |
|---|---|---|---|
| 4,478,516 | 10/1984 | Kessler | 366/87 |
| 5,055,027 | 10/1991 | Sato | 425/197 |

FOREIGN PATENT DOCUMENTS 1173509  10/1969  United Kingdom ................... 425/199

*Primary Examiner*—George Yeung
*Attorney, Agent, or Firm*—George W. Dishong

[57] ABSTRACT

A cooking-extruding apparatus and method for the cooking-extrusion of biopolymers for the production of thermally treated food granulates, snack products, cereals or similar products. The cooker-extruder having a feeding hopper, a conveying screw, an exit nozzle, and at least one spatula-pump disposed between the conveying screw and the exit nozzle. Each spatula-pump includes a spatula element and plate having a matrix of holes. In operation, the spatula element assists the material being processed through the plate having a matrix of holes. An embodiment of the apparatus of the present invention includes the use of two conveying screws. The spatula-pumps are arranged serially such that the material being processed passes through one spatula-pump to the next until it is passed through the exit nozzle of the apparatus.

19 Claims, 8 Drawing Sheets

COOKER-EXTRUDER APPARATUS AND PROCESS FOR COOKING-EXTRUSION OF BIOPOLYMERS

SUMMARY OF THE INVENTION

The invention relates to a cooker-extruder with a feeding hopper as well as a single screw and a nozzle and according to an embodiment to a double screw extruder, for the production of thermally treated biopolymers.

Moreover, the invention relates to a process for cooking-extrusion of biopolymers for the production of thermally treated food granulates, snack products, cereals or similar products.

BACKGROUND OF THE INVENTION

Such cooker-extruders are known (see for eg. EP 0 221 918 B1).

General descriptions about cooker-extruders can be found, among others, in Judson M Harper "Extrusion of Foods" 1981 CRC Press, Inc. Boca Raton, Fla., USA, as well as Mercier, Linko, Harper "Extrusion-Cooking" 1989 American Association of Cereal Chemists, Inc. St. Paul, Minn., USA.

The requirements as to a cooker-extruder for biopolymers may be summarised as follows:

High throughput capacity combined with high product quality, which is determined by constant process conditions, good homogenising (mixing, defined temperature creation, good formability of the dough as well as low investment costs, low maintenance cost and flexible process design and finally good controllability at fast reaction times and simple handling, especially, during starting of operation, dismounting and cleaning.

As compared to double screw extruders, single screw extruders have significant advantages, as also presented here, since the former are complicated in construction, require significantly more wear parts and hence contribute to higher maintenance costs.

On the other hand one attributes lower flexibility to the single screw machines and especially one criticises the often nonreproducibility of the temperature conditions and bad mixing-effect/homogenising.

SUMMARY OF THE INVENTION

In cooker extruders of the type mentioned above, the invention is based on the problem to improve the behaviour of such a cooker extruder in a surprising manner in view of the homogenisation as well as in view of the texture of the end product, which should be more uniform, in view of sufficient and controllable expansion, as well as the controllability of the temperature using the relationship, of mass flow/screw speed. Also, the often negative influence of the fat and/or sugar in the raw material mix, on the texture of the product should be reduced.

According to the invention, this is achieved in a cooker extruder having a feeding hopper, at least one screw as well as a nozzle for the production of thermally treated biopolymers, by at least one spatula-pump arranged between the screw and the nozzle, each of which consist(s) of a matrix of holes and at least one associated spatula element (together defined as "spatula-pump").

In case of a single spatula-pump, the flight ends of the screw advantageously in a single screw extruder are formed in the shape of a wedge and use is made of the fact that the screw is allowed to rotate with a small gap with regard to a plate-with-holes. This configuration of the wedge shaped end of the extruder screw meets the above mentioned objective as per the invention, especially after being integrated with the plate-with-holes.

Preferably, at least two such spatula-pumps are positioned between the screw and the nozzle.

Surprisingly, not only is the above mentioned objective met but even the following achieved, thereby, that one supplements a conventional short single screw extruder, for example with a length to diameter ratio, L:D of say, 2:1, whose screw head is already formed in the shape of a spatula and which glides over a plate-with-holes, by one or more spatula-pumps of the type defined above, each of which consists of one or more spatula element(s) and one plate-with-holes:

The homogenising is improved and the texture of the end product becomes more uniform. The dough emerges more uniformly out of the nozzle. Inspite of the very small residence time (less than 8 seconds) significantly more fat and / or sugar can be processed while obtaining sufficient expansion (normally, the presence of fat and / or sugar leads to strongly reduced expansion). The controllability of the temperature with the help of the relationship of the process variables, mass flow: screw speed is significantly increased, ie. a higher screw speed at constant mass flow delivers a clearly higher dough temperature as compared to a similar unit without additional spatula-pumps and vice-versa resp. an increase in the mass flow. Thereby a relative reduction in the specific mechanical energy input is enabled. The relationship of screw speed to dough temperature is linearised quite significantly.

The throughput capacity with at least one additional spatula-pump at same product quality is up to 100% higher, as compared to a machine without additional spatula-pump.

Due to material smeared centering of the extruder screw at the passage through the matrix of holes, the radial forces are supported and due to the better centering, contact between the screw and extruder cylinder is avoided. The wear of these parts is thereby reduced.

The construction elements for such a spatula-pump are very simple in design, can be manufactured economically and are subject to only low wear. By placement of many spatula-pump-stages one after the other, the process conditions can be adjusted very flexibly and thus matched to the product demands. The assembly, disassembly and the cleaning of these parts are very simple and quick. The arrangement of the elements "spatula head" (width and relative angle of the spatula surface to the matrix of holes) and "matrix of holes" (number and diameter of the holes as well as the thickness of the plates) in accordance with the known rules of flow-dynamics leads to innumerable specific configurations corresponding to the required process conditions (raw material moisture, temperature, viscosity, residence time, required pressure for nozzle passage etc.) and this in an economical manner.

Especially, the spatula arms of the twirling type spatula-pump, which glide over the plate(s) with holes, can stick out or perpendicularly stick out from the axis of rotation, have circular cross section and can be formed as cylindrical or conical rollers, as described later.

The conception of the matrix of holes ensures, that a large total metal surface which comes in contact with the medium is available. In comparison with heat transfer possibilities in conventional extruder construction methods (mainly exclusively via the extruder cylinder) this larger surface is of major advantage for any possibly desired heat transfer (cooling or heating), for example by conveying steam / cooling water or heat conveying oil through channels present in the matrix of holes.

By the surprising behaviour of the spatula-pump it can be shown, that the extruder screw can be reduced in its function to a simple feeder screw for pre-compression.

It may even be possible to completely dispense with the extruder screw when for example the spatula extruder is positioned vertically and the raw material is directly fed in a forced manner to a multistage spatula-pump.

The spatula elements can be connected with each other and to the screw via a common shaft. Insofar that the characteristics of the dough allow a rotation seal at the higher pressure end, it is even possible to have a drive for one or more spatula-pumps, independent of the screw.

It is interesting, that the cooker extruder can consist of only a series of such spatula-pumps, whereby the spatula extruder must be primarily oriented vertically. One can thus completely dispense with the extruder screw.

Most important advantage of the invention can be seen therein, that the extruder tools, especially, extrusion cylinder, under certain circumstances, the screw, the matrix of holes, the spatula elements, as well as the nozzle etc. can be made of steel, cast iron or other such, for food application noncritical materials, i.e, need not contain the usual heavy metals and additives required for hardening and wear protection. Dimension changes caused due to wear have, in comparison to conventional design, only a negligible influence on the process, especially the throughput. In known screw machines, an increase in the gap between screw and cylinder of a few fractions of a millimeter, caused due to wear, can already cause a capacity fall of 30–40% or increase the energy input into the dough to unacceptable values.

As per a special design of the invention which brings decisive advantages, the matrix(ces) of holes can be formed on the inflow side as a concave surface and the corresponding spatula element(s) complementing this concave surface can be located right opposite and designed following its contour.

A basis of the invention is also the abovementioned process, in which after the extrusion, the extrudate strand, before the forming in the nozzle, is passed through a minimum of two spatula-pumps.

Preferably, it is possible to work with a process volume of only approx. 200 cm$^3$ per spatula-pump level at a mass flow of 200 to 350 kg/hr and the resulting residence time of 2 to 4 seconds.

The so-called pellet presses are already known, which are used for compressing materials in powder form, granular form or fibre form, and produce pellets, ie. a compressed granular material. These are already manufactured with rotating matrix of rings, but also with fixed matrix of rings and rotating tools or matrix in disc form and cone shaped or cylindrical pressing rollers. This has however, nothing to do in the area, in which the invention has been made, since as per the invention it is not the intention to produce pellets. Such pellet presses naturally try their best to avoid a development of pressure after the passage through the first press stage. The aim is, after all a compressed granulate and not, as in the case of cooker extrusion, a maximumpossible homogeneous mass, which then under certain circumstances, develops a porous, crispy texture by the evaporation of water.

As per the invention, the material is subject to a pressure, on emerging from the matrix, which compresses the material into a fluid mass. This mass may be then passed through a further spatula-stage (because of the dominant fluid characteristic of the material the term "pump" is preferable), a process that can be repeated a number of times, either to achieve a further mixing and homogenising due to the processing or develop a higher final pressure in order to push the material through the nozzle.

Actually of importance is the combined action of two spatula-pumps installed after one another or alternatively of the end of an extruder screw, formed like a spatula head and a matrix of holes with another spatula stage.

Obviously, the fluidised material in the region of the matrix with holes is set into an oscillating movement. This is achieved eg. in that manner that after the spatula element has passed over, a part of the fluidised material, subjected to the high pressure on the discharge side, flows back through the matrix of holes. At least it is possible to visualise such a situation.

The deliberate pressure variations, which lead to the oscillating movement, can naturally be caused through other known means like membrane or piston. Finally it can also be caused by eccentric screw, by pulsations or by ultrasound.

Between the first and the second "spatula-stages" one finds still compressed material, which in its aggregate condition is "nearly fluid" or "fluid", ie. may still contain solid particles or such traces but whose main phase is primarily fluid.

Conveniently, a higher pressure is built up in the direction of movement in front of the rotating spatula arm and behind the spatula arm the pressure is lower. The dough experiences an oscillating flow direction and an oscillating pressure. For this purpose, an average pressure of more than 10 bars is maintained between the first and the second stages.

In case only one stage is present, then the matrix is not necessarily the same as the nozzle. Rather further pressure elements as well as the nozzle are necessary in order to buildup the requisite pressure.

These recognized alternating effects can be related to the product and process demands in a rational manner.

Shape of the spatula surface: This can be straight, curved or even cylindrical or spherical or of rotating profile. Under the term "rotating" eg one could understand a twirling beater, whereby eg. one axis of the beater is rotating and the beating arms themselves (perpendicular to the drive axis) are also rotating, eg. in the form of roller body.

Inclination angle of the spatula surfaces to the matrix of holes: would be selected smaller than 90 deg. and larger than 0 degrees. If one takes a smaller angle, it results in a smaller throughput and higher pressure, whereas a larger angle results in larger throughput and lower pressure. The surface characteristics of the spatula surface, in case optimal transport is desired, is then as smooth as possible, under certain conditions even coated. Thereby there is a low friction if not even slippage. As against this, the surface of the matrix of holes is as rough as possible, which leads to a higher friction. This is already achieved by the holes, but can be further increased by suitable means.

The thickness of the plate/matrix of holes: In case a larger thickness is selected, one gets a higher resistance to flow, a higher level of material shear, a higher energy dissipation and also a higher dough temperature and vice-versa.

The number of the holes: Many holes mean lower resistance and higher through-flow through the matrix of holes.

The diameter of the holes: Larger diameter means lower resistance and higher throughput. Smaller diameters mean higher resistance, higher product shearing / homogenising / mixing effect at the matrix of holes.

The cross section of the bores / matrix of holes: These can also change under circumstances along the length. It can be conical either tapering, widening or both. Special rheological effects are thinkable. A venturi nozzle form is also possible.

Shape of the plate of holes: This can be in the simplest form ie. plane. Corresponding to the behaviour of the spatula element and the desired product flow, it can also be with a surface profile eg. spherical or conical either tapering or widening.

Angle of the bores: To the spatula plane, is either perpendicular or inclined, concentric to the axis of rotation or assymetric in a planned manner, either inclined towards or against the direction of rotation.

Number of stages (spatula-pumps in series): These are selected dependent upon the required extrusion pressure, required or maximum permitted residence time, the mechanical energy input, which is required for the processing of the material. It can also be in the form of one or more spatula-pumps conveying in opposite directions for special mixing and kneading functions, in case required.

Construction-wise, the mechanical demands on the individual elements are less, as compared to the usual screws and sleeves. on the other hand the effect of a certain amount of wear, does not negatively influence the process conditions, to such an extent as in the case of conventional extruders, in which even changes of a fraction of a millimeter, can influence the process significantly.

Finally, as per the invention, still a process for cooking extrusion of biopolymers for the production of food granulates, snack products and cereals is provided, which characterizes itself in that bio-polymers are passed through two spatula-stages and after the development of pressure before the nozzle, are pressed through the nozzle, the process being advantageously carried out vertically. Revolutionary in this suggestion is that it is possible to totally dispense with the use of the extruder screw.

When in the presented description the vertical design is not specifically mentioned, then it refers to a horizontal design with a horizontally lying extruder cylinder. The arms of a spatula element can have a round cross section, can be fixed (spatula or scraper) or can rotate over the matrix of holes. In case of many stages the first stage can be equipped with rotating rollers.

The elements gliding on the plate of holes can be conical, reducing from inside to outside and under certain conditions also can be rotating on their own axis, the matrix of holes being shaped in a complementary manner on its upper side, ie. thickening from inside towards outside.

Another solution is offered by an extremely small flight depth of the screw with a relationship of flight depth to screw diameter, of for example only between $1/20$ to $1/50$.

In case of a vertical multistage cooker extruder, mostly without screw, it is possible to have different chamber volumes corresponding to the increasing compression in the direction of the mass flow. Hereby, also the spatula elements located here are designed correspondingly smaller in their dimensions.

It is also possible to design a kind of pellet press with a vertical shaft perpendicular to these rotating cylinder rollers, whereby the rollers roll or pass over the matrix of holes. Further, a nozzle of that type is following the matrix of holes, so that in front of the rollers or similar elements, the dough is fluidised by pressure and behind the rollers on the outflow side of the matrix of holes, evaporation can be caused.

The process also may be described in such a way, that the transport pressure of the screw, the mass flow of the material to be extruded, the temperature in or alternatively of an extruder, but above all things, the pressure in front and behind the matrix of holes or the spatula element gliding on them is so selected, that behind the spatula element in the spatula chamber there is a zone of lower pressure, with the evaporation of the fluid contained in the mass to be extruded, and in front of the spatula element in the pressure area of the plate of holes, a pressure buildup and fluidisation of the fluid vapours, specially water vapour, is caused.

It is also possible, that the spatula element, be it round or preferred in the form of a metal sheet set at a sharp angle to the surface of matrix of holes, be allowed to pass over as close as technically feasible to each front and back surface of each spatula chamber formed by the surface of plate of holes. Further, the gap of the spatula elements to the matrix of holes in front of it, can be smaller as compared to the gap to the matrix of holes behind it in the direction of the mass flow in order to achieve a higher friction at the matrix of holes in the front and thus a higher transport efficiency of the spatula-pump stage.

The invention also relates to the use of the measures as per one of the described claims with double screw extruders. These can be constructed to be much shorter and therefore, simpler and more economical. Complicated kneading and homogenising elements can be dispensed with. Such a double screw extruder would have, as a result, better homogenising, more uniform shear and heat distribution, better wear behaviour and better controllability.

Finally, the invention also relates to a process for cooking extrusion of biopolymers, which is characterised in, that the necessary conditions for cooking extrusion like pressure, temperature, fluidisation and homogenising are brought about finally by one or more spatula pump stage(s).

Example designs of the invention should now be further explained with reference to the enclosed drawings. These show in

DETAILED DESCRIPTION OF THE DRAWINGS

Figure 1:
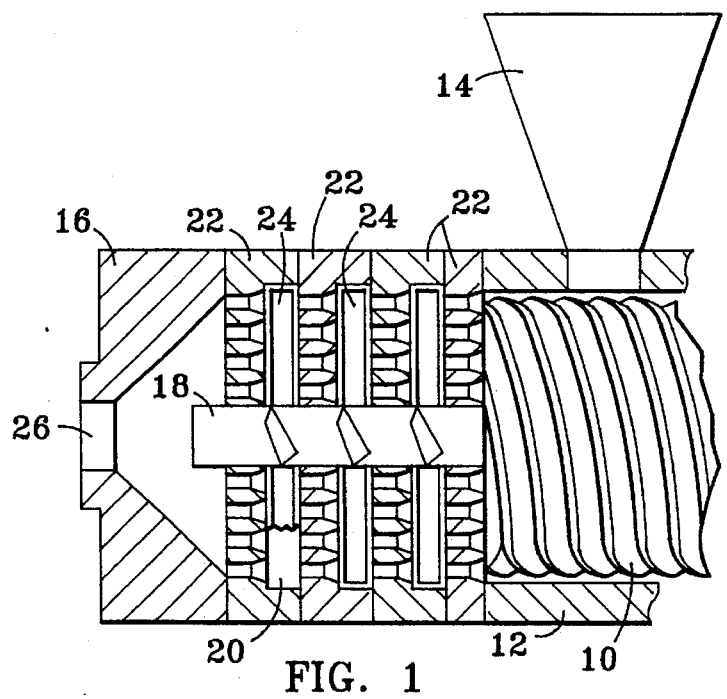
FIG. 1 a first embodiment (design) of the invention in schematic longitudinal section.
Figure 2:
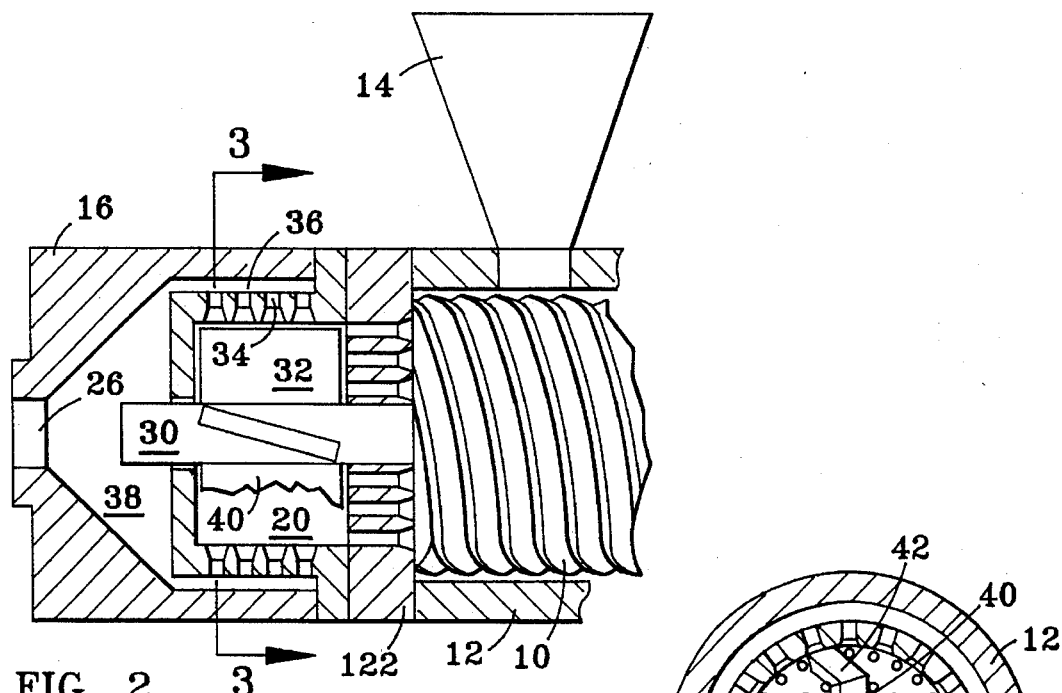
FIG. 2 a second design in schematic longitudinal section.

As per FIG. 1 (the most preferred embodiment), the feeding hopper 14, extrusion cylinder 12 and conveying screw 10, are already existing parts of the conventional extruder, however it is further seen, that according to the invention, the screw is assigned a different function compared to the state of technology. In the extension of the axis of the screw 10 one finds a shaft 18, on which the matrix of holes 22 and the spatula element 24 are mounted. Each set comprising of spatula element 24 and matrix of holes 22 would be called "spatula-pump" or "spatula-stage". The first stage can be visualised as one comprising the conveying screw 10 and the matrix of holes 22, provided that the head of the screw is formed in the shape of a wedge ie. at an angle between 0 and 90 deg.

In the example, the holes of the matrix are in general straight. The spatula element 24 consists of elements similar to a propeller, which are set eg. at an angle of 60 deg. to the surface of the matrix of holes and pass over the matrix of holes at a technically feasible distance. After each matrix a certain pressure is built up. The nozzle 16 functions, at its guiding walls, as a pressure element, till finally the extrusion occurs at the opening of the nozzle 26.

As per a second design as shown in FIG. ⅔, the parts with similar functions have been assigned the same reference numbers. Feeding hopper 14, screw 10 and cylinder 12 are the same as in FIG. 1. The shaft 30 is again mounted on the extension of the axis of the conveying screw 10, on which however now are located: a matrix of holes 122, and a spatula element, of reasonable length, capable of rotation. This passes over a cylindrically formed matrix of holes 34 (design in hat form), whose openings are not axial, as in the case of the matrix of holes 122, but radially directed outwards. Thus after emerging from the matrix of holes, a reasonable pressure is built up in the intervening space 36 (channel). The material transforms then (cross section reduction), under simultaneous material jamming, in the space 38 preceding the nozzle 16, into high viscous or a fluid condition, before it leaves the extruder at the nozzle opening 26, where it expands.

Figure 3:
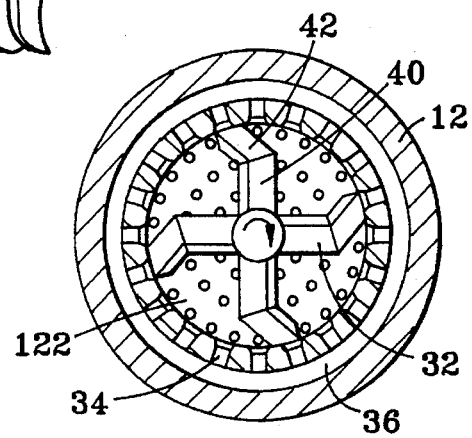
FIG. 3 a section across the spatula-pump stage.

The spatula element 32 has been shown in detail in FIG. 3, where in the shape of a propeller, it is fitted with four arms 40 which are provided with offsets 42. The propeller wings pass over the openings of the matrix of holes 34 of cylindrical shape, one after the other. The direction of rotation of the spatula element has been shown. The actual setting of the spatula element is not critical. As per the desired pressure on the other side of the matrix of holes, it is sufficient to have possibly an inclination of a surface as long that it passes over the surface of the matrix of holes.

Figure 4:
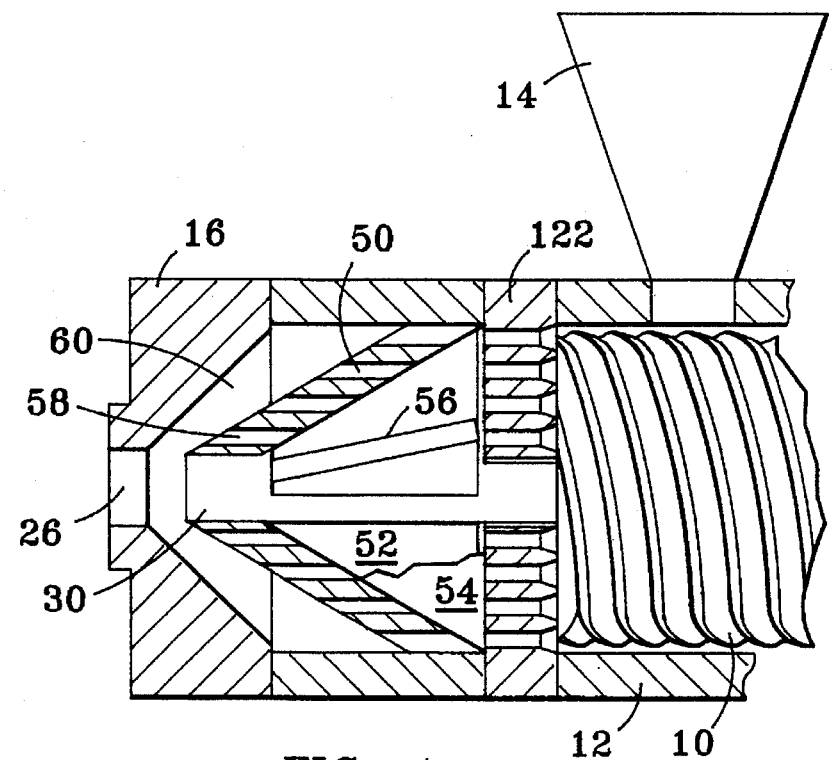
FIG. 4 third design in schematic longitudinal section.
Figure 5:
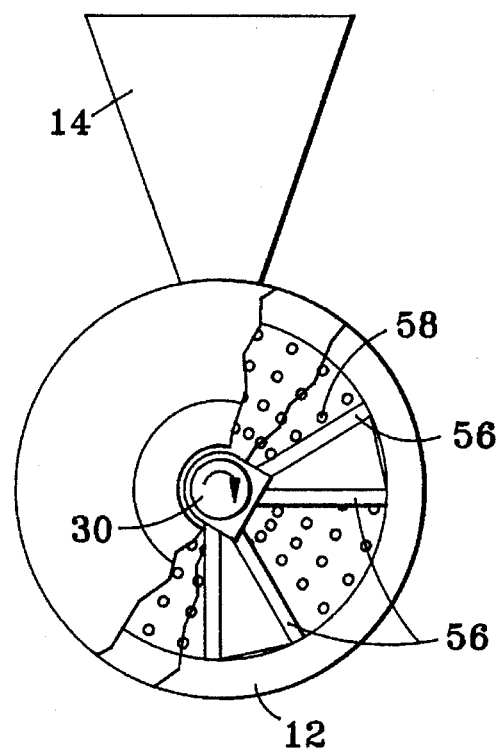
FIG. 5 a section through the spatula-pump stage of FIG. 4.

The FIGS. 4 and 5 show a third possible design, in which the second matrix of holes 50, in the form of a hollow cone and the spatula element 52 inside the spatula space 54, which together with the matrix of holes 50, comprise the spatula-stage, are formed in the shape of a cone. The wings 56 of the spatula element are slightly inclined against the axis 26 (max. angle around 30 deg. to the middle axis). In the example shown, the holes 58 of the matrix 122 as well as those of the matrix 50, are running straight and parallel to the axis. Pressing through the holes 58 occurs against a pressure in the cone-shaped space 60, before the material is conveyed further, jammed by the inclined walls of the nozzle opening 26.

Due to the wedge effect of the chamber narrowing in a direction opposite to the direction of the movement, pressure is created together in combination with the friction of the product, at the sieve or plate-with-holes, due to which the material is pressed through the holes or the sieve.

In order to produce the preferred teaching as per the invention (sufficient pressure difference, so that in front of the element a fluidisation of the dough and on the leeward side, every time an evaporation and hardening of the dough occurs) and that for example in a single stage version with only one plate of holes, one can follow one of the two following alternatives. Either the mass flow to be transported by the screw must be kept so low, that on the low pressure side of the spatula element, the evaporation of water is enabled (can be done only with extreme reduction of capacity) or the spatula element must be physically dimensioned in a generous manner, so that the pressure relationships are set in such a way, that water can evaporate.

In most designs, the transport effect of any symmetrically formed element is used if only it is rotating and passing over a plate of holes. Then it creates a transport effect when the friction of the dough with the plate of holes, which is passed over very closely in the direction of transport, is larger as compared to the back side. Even a round stirrer rod, when used as per the measures in accordance with the invention, has not only mixing function but also transport and flow-dynamic functions.

Extremely important is the above mentioned pressure difference, in front and behind the rotating element, passing over the matrix of holes, for achieving the pressure relationships in such a way, that due to the oscillating back-flow water is evaporated.

In designs with numerous spatula-pump stages one can consciously proceed so that one or more spatula-stages, do not have the objective of evaporating water, but exclusively contribute to pressure build up, or for example working in a direction opposite to material transport, with the specific aim of creating pressure differences between numerous spatula-stages.

Figure 6A:
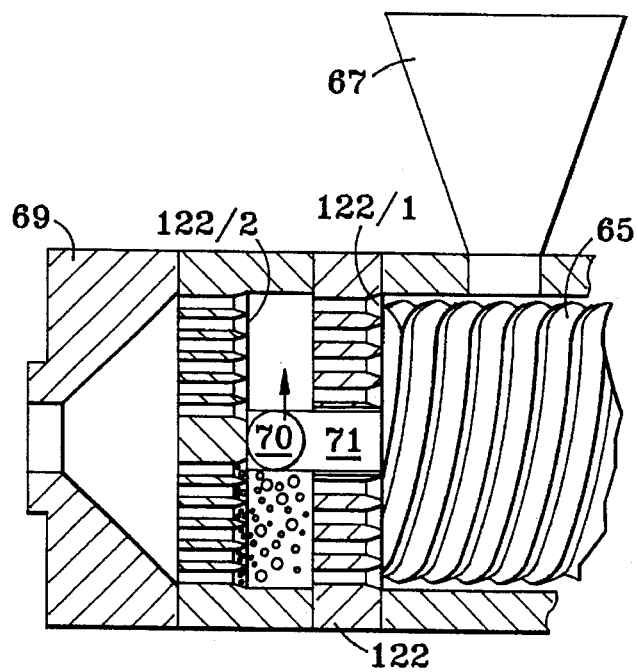
FIGS. 6A and 6B are a left side view in section and a right side view in section respectively, of a fourth design in schematic.
Figure 6B:
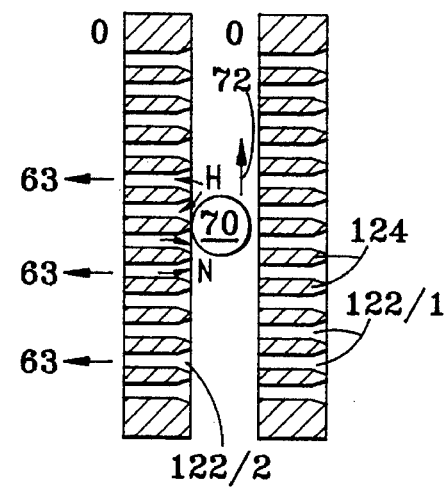
Figure 7A:
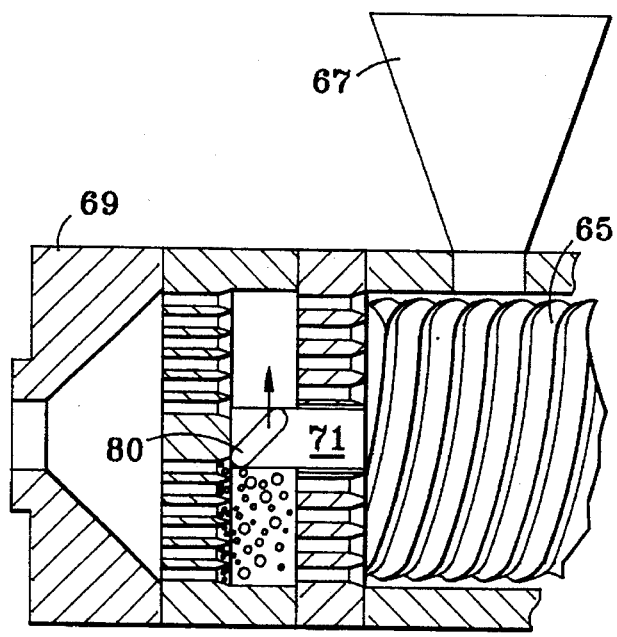
FIGS. 7A and 7B are a left side view in section and a right side view in section respectively, of a fifth design in schematic.
Figure 7B:
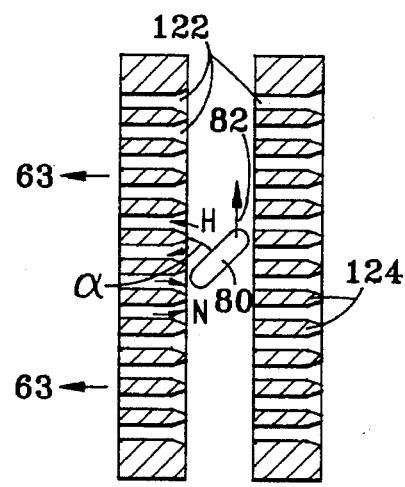

FIGS. 6 and 7 show further examples of the invention, whereby in each at right (B) of the drawing the flow and pressure relations have been indicated. The channels in the matrix of holes in both the figures are marked 122 and have widenings 124 in the direction of the flow. Round rods 70 glide over the matrix of holes, of which about four can be foreseen perpendicular to a shaft 71 and which in the manner of a twirler move in the direction of rotation 72. The area of high pressure and high temperature is indicated with H and the area of low pressure and low temperature is indicated by N. High pressure exists in front of the cylindrical element 70, which liquefies the dough and presses it through the channels 122 of the matrix of holes. The temperature at H increases significantly due to the pressure and friction. The main direction of the mass flow is indicated by 63. Between the inflow side and outflow side 0 (mass flow direction) a significant pressure fall is planned as per design and operation. Thus the pressure is lower on the outflow side of the matrix of holes and still a little lower behind the cylinder element 70 (FIG. 7). Due to the lower pressure and lower temperature a part evaporation of the fluid occurs there, specially of water or other dissolving medium, thus causing a backflow and due to the movement an enormously desirable homogenising of the dough. The head end of the screw 65 (fed from the feeding hopper 67) is again formed as a spatula. During operation of the unit the dough experiences, besides others, a transportation in direction of the nozzle 69. This is shown as per the design on the left side of the figure. Here we have the design with a single extruder screw 65, in which, besides the head formed like a spatula, a matrix of holes 122 is also foreseen. A space 0 of the type described earlier is present between the first matrix of holes 122/1 and the second matrix of holes 122/2, whereby on the second matrix of holes, a twirl type element 70 with arms in the form of a round rod is rotating. The evaporation here is by large bubbles, the fluid dough consistence being shown by small points. Thus, this is a two-stage extruder, the first stage formed by the spatula head of the screw press and the following matrix of holes 122/1, the second formed by the twirling element 70 and the second matrix of holes 122/2. The channels are always rough on the inflow side and significantly widened and offer an enlarged contact friction surface. In this design as is the case with most other designs, the gap of the twirling element to the corresponding following matrix of holes is small and with reference to the outflow side of the first matrix of holes 122/1 relatively larger. In order to cause a friction difference and increased transportation efficiency of the spatula-pumps the shaft 71 passes through the first pressure plate 122/1, but not through the second. The passage of the shaft also helps in screw centering. Although the element is round and located perpendicular to the surface of the matrix of holes due to the wedge effect of the narrowing space in a direction opposite to the movement, a pressure is created together with the difference in the friction of the product at the matrix of holes, which pushes the materials through the holes.

The counter pressure is maintained by the nozzle or at the nozzle.

By the thickness of the plate-with-holes 122 as well as the number and the size of the holes, the pressure relationships can be consciously influenced, whereby the widening of the holes to the spatula element and the adhesion or the friction of the mass on the surface of the plate of holes have further influence. Decisive is the linearisation of the process behaviour by the invention, a linearisation, which is valid for all designs.

FIG. 7 shows a similar design equipped with somewhat long spatula elements 80. The element is set at an angle α (with reference to the surface of the second matrix of holes) with the angle α smaller than 90 degrees. The high pressure (H) area and the low pressure (N) area are again as shown. The direction of rotation of the twirling element is as per arrow 82.

The design drawing (left) is otherwise drawn similar to the FIG. 6. The compression condition (small points) is again indicated i.e. higher pressure, higher temperature, for example fluid dough, the low pressure are shown by bubbles, where the fluid evaporates and this flows from the space behind the second matrix of holes (space which leads to the nozzle plate) back to the space between the matrices of holes and thereby causes an excellent homogenisation of the dough as a result.

Same reference elements mean same arrangements. This concerns a similar two stage design.

Figure 8:
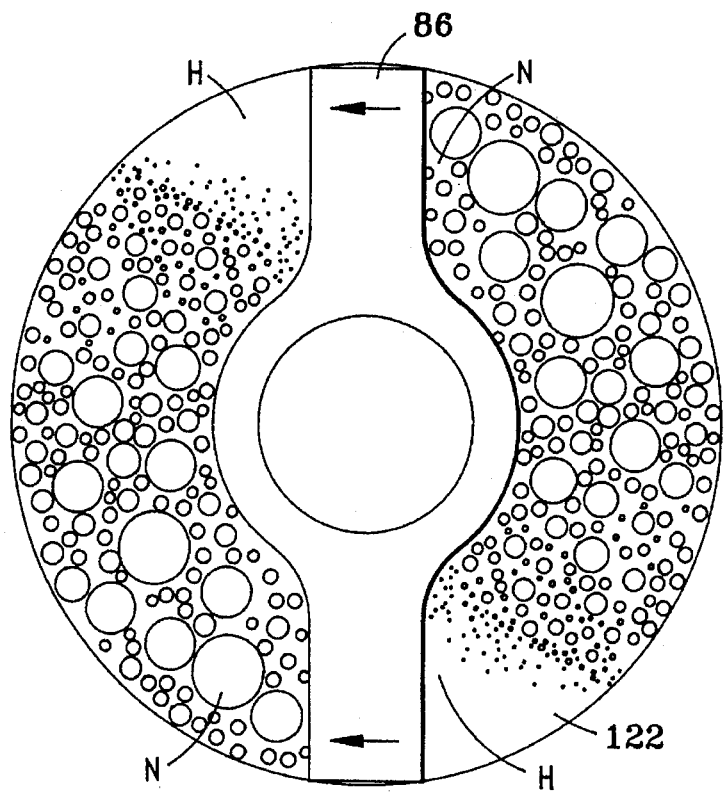
FIG. 8 is an indication of the relation of the dough which is in the extruding state.

FIG. 8 shows a detail of what happens at the matrix of the holes 122 in the high pressure and the low pressure areas (H&N). A round rod element 86 rotates over the matrix of holes 122 and has only 2 arms in the design examples. The element can also be any other form of element which only for simplicity has been shown with two arms. In the high pressure area H, before the spatula element (rotation direction shown by arrow) the dough is compressed, the water condenses, the temperature rises. In low pressure area N the water evaporates, the dough expands and thereby assumes a temperature, which corresponds to the absolute pressure at that point. Due to the low temperature as well as the expanded form, the dough has a higher viscosity. Hereby a resistance is provided to the material flowing back through the matrix of holes into the low pressure area, which causes that more material in high pressure area flows through the matrix of holes as compared to that, which flows back into the low pressure area. In this figure, the relationships in the dough and not the holes in the matrix of holes has been shown.

Figure 9:
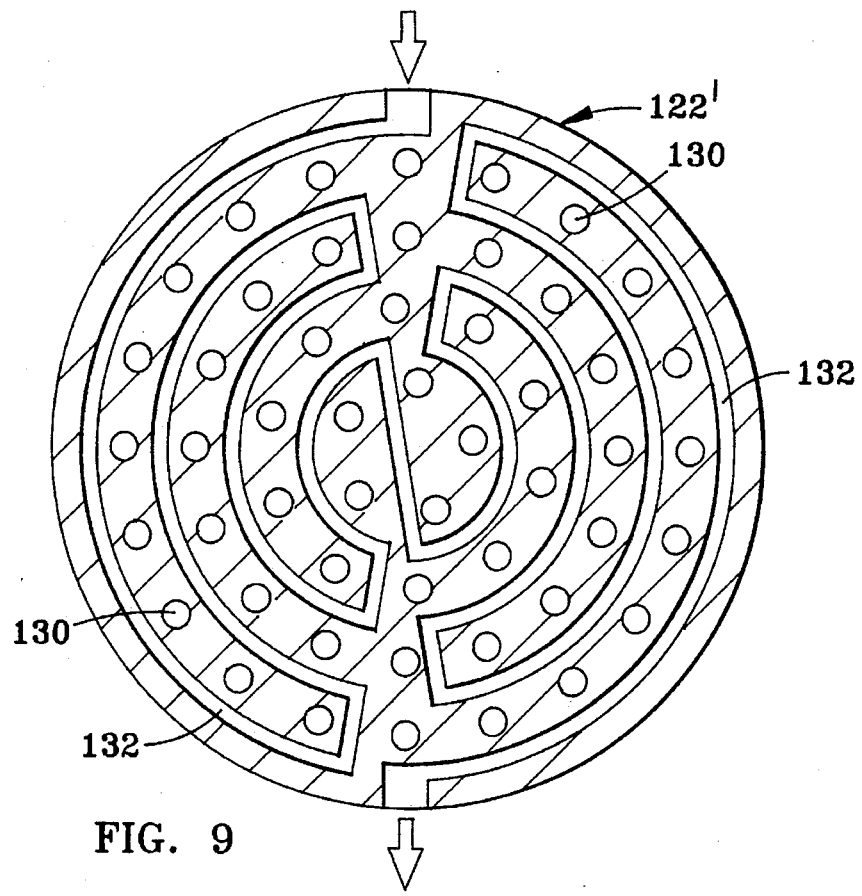
FIG. 9 shows a constructional detail.

FIG. 9 shows a plate of holes or alternatively a pressure plate 122, with uniformly distributed holes 130 and specially created tempering channels 132. The flow direction of the fluid is shown by the arrow (entry-exit). In the design shown here all the matrices of holes or only a few of the matrices of holes may be equipped with such tempering channels 132.

Figure 10A:
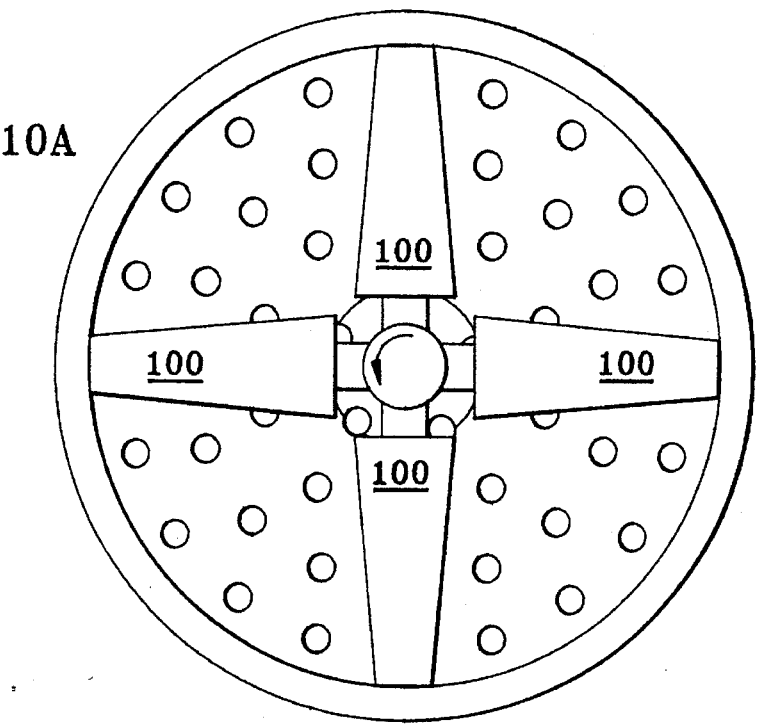
FIGS. 10A and 10B are a top view and a side view in section respectively, of a special design with 4 arms.
Figure 10B:
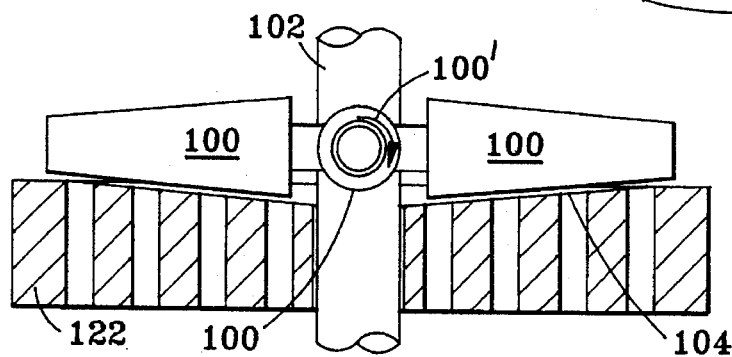

FIG. 10 shows a further modification, in FIG. 10 A in top view, in FIG. 10 B in section through a plate of holes 122. The widenings of the holes (inflow direction) can be foreseen, but have not been shown. The special aspect in the design is that the rollers perpendicular to the axis 102 are conical with decreasing cross section from inside towards outside. The pertaining profile of the plate of holes is shown complementarily conical (enlarges itself as shown in 104 in its thickness from inside towards outside) so that the conical rollers can run without problems on the conical profile 104.

The rollers located on the twirling arms, in the present case conical in other designs for example cylindrical, can also be designed so that they themselves are also rolling (arrow 100'). The rollers 100 then rotate on their own axis. On the other hand the twirler rotates itself in the direction shown in FIG. 10 A. The rotation movement in the directions perpendicular to each other superpose one another.

Figure 11:
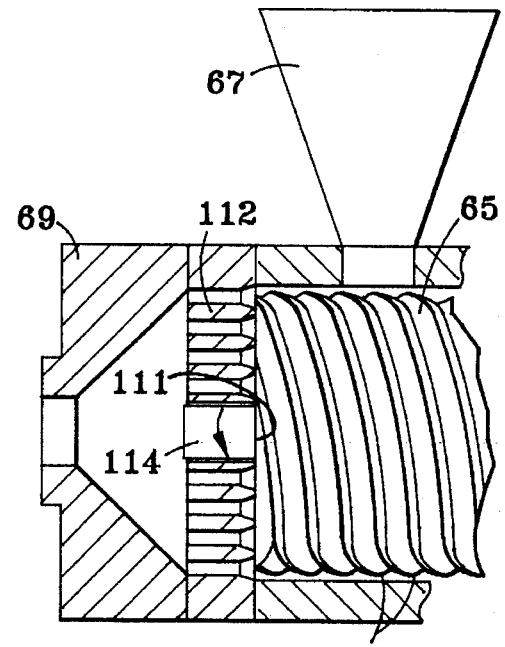
FIG. 11 introduces a single stage arrangement.

FIG. 11 shows a single stage horizontal design with spatula shaped screw-end 111. The corresponding plate of holes 112 carries a shaft adaptor 114 for screw centering. Important is the screw geometry: as shown, the screw has an extremely small flight depth (at 115) in comparison with known designs for optimised throughput. This flight depth, most unfavourable for the transportation, however manages to create a sufficiently low pressure on the low pressure side of the spatula element, which guarantees evaporation of water. For example, the relationship of flight depth to diameter can be between 1/20 to 1/50.

Figure 12:
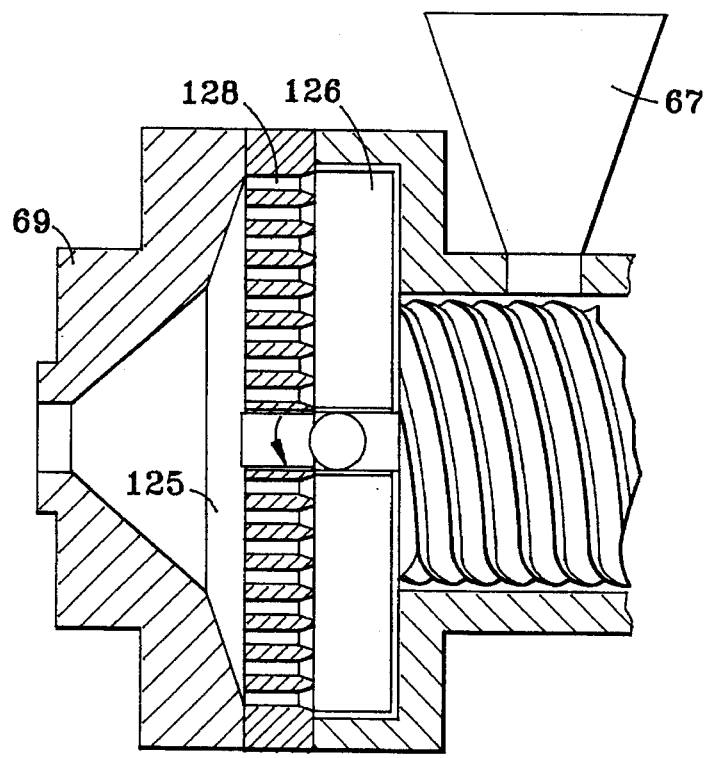
FIG. 12 shows a embodiment (design) with different dimensional relationship between spatula element and screw.

FIG. 12 shows the design with one spatula element 126 and a matrix of holes 128 whose diameters are large as compared to the diameter of the screw. For example the relationship of the diameter of the spatula element / matrix of holes to the diameter of the screw can be between 2,0 to 3,0:1. Significantly higher transport capacity can be achieved as screws with deeper flights are possible (although a low flight depth has been shown). By this design, sufficiently low pressure is maintained in the area of inflow before the matrix of holes 128 and in direction of movement of the spatula element 126, behind the spatula element as well as on the outflow side with reference to the matrix 128 and in the chamber 125 adjacent to the nozzle 69, which enables the evaporation of water.

Figure 13:
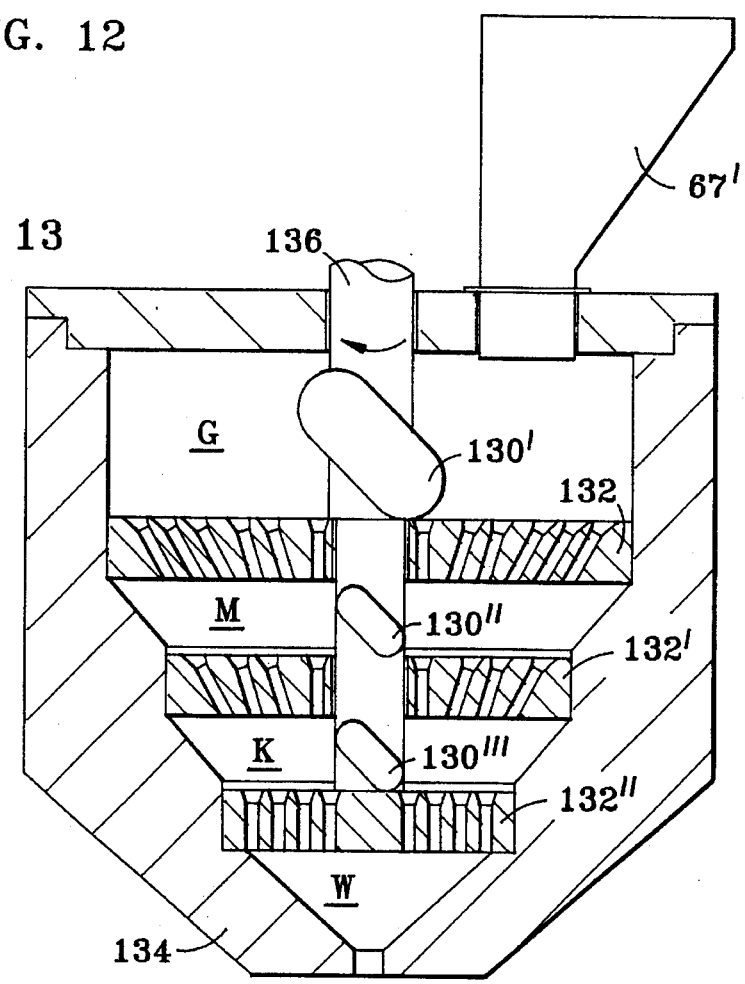
FIG. 13 explains the possibilities of the absolutely new principle.

FIG. 13 shows a completely different type of design and moreover of vertical type. A screw is not foreseen in this 3-stage cooker extruder of vertical construction. Chamber volumes G, N, K, W reduce in direction of compression from powder form to fluid (mass flow direction). Three stages with reducing chamber volumes are foreseen, the corresponding spatula elements 130', 130", 130''' are also designed correspondingly smaller. Here we refer to spatula elements which are similar to those in FIG. 7.

The plates with holes 132, 132', 132", are also correspondingly smaller. The cylinder space reduces itself correspondingly in stages upto the nozzle 134.

Corresponding to the diagram, the holes are inclined so that the mass flow goes smoothly even upto the smallest chamber W in front of the nozzle through the holes of the matrix of holes 132, which are widening. The shaft 136 rotates again on its vertical axis.

Figure 14:
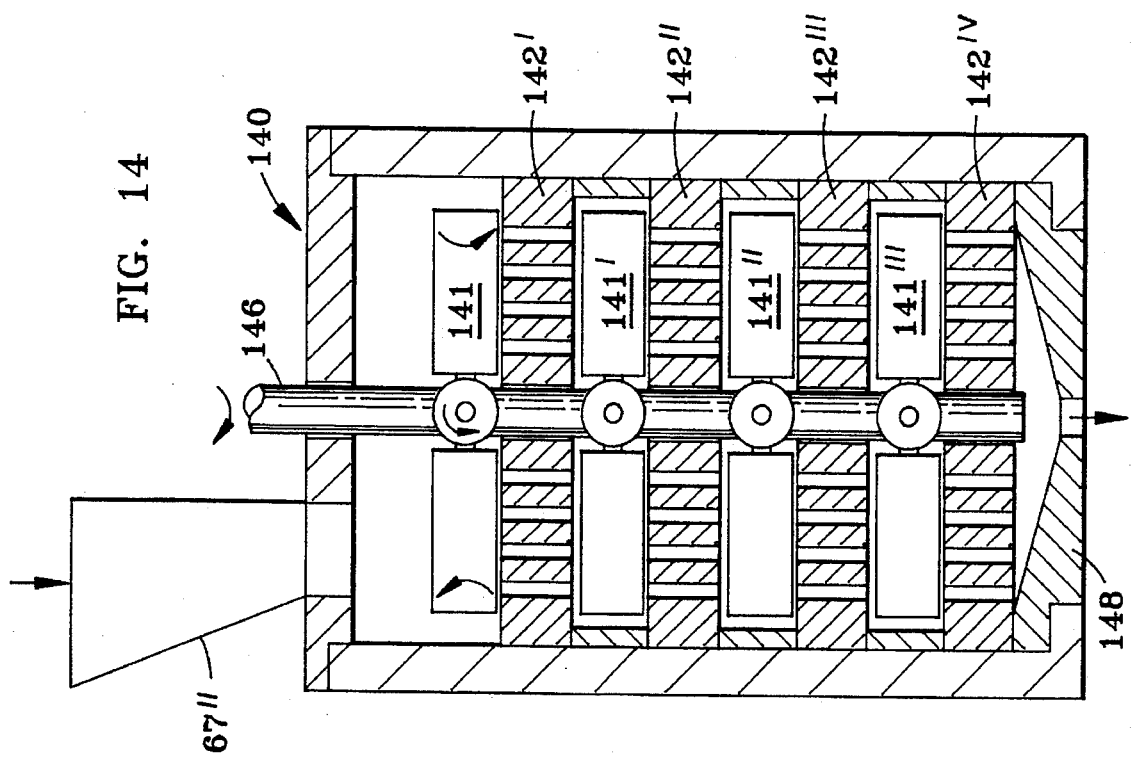
FIG. 14 shows another design similar to FIG. 13.

FIG. 14 shows a four-stage vertical cooker extruder 140 whose speciality, besides others, is that in the first stage the cylindrical rollers are further themselves rotatable. The direction of rotation of the shaft 146 for the spatula elements is indicated in the same way as the direction of rotation of the cylindrical rollers in the first stage. The first roller 141 runs like a calender over the first matrix of holes 142' the rest of the rollers 141', 141", 141''' glide over the corresponding matrices of holes 142", 142''', 142'''', before the nozzle 148 is reached. The mass flow transport direction is shown by the white arrow.

Figure 15:
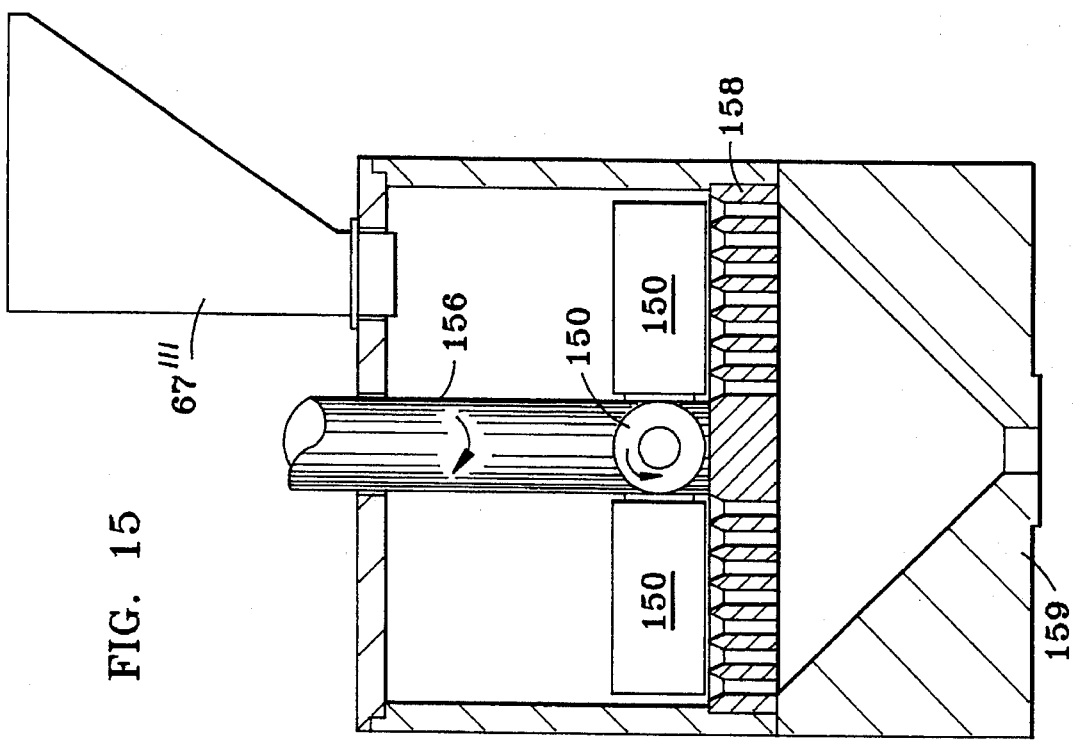
FIG. 15 shows a modification of the relationship as compared to the earlier figures and FIG. 16 shows a schematic section through a double screw extruder.

FIG. 15 shows a single stage vertical design similar to a pellet press with rotatable cylindrical rollers 150, a feeder 67''', a vertical shaft 156, on which the rollers 150 are located, for example perpendicularly. The rollers 150 roll over the matrix of holes 158. The design, though similar to a pellet press, is however fitted with a nozzle at the exit in accordance with the invention. Besides others, a pressure is developed. As with all described designs it is so that in front of the rollers, inclined elements or similar, the dough liquefies and behind the rollers an evaporation and part back flow takes place.

Figure 16:
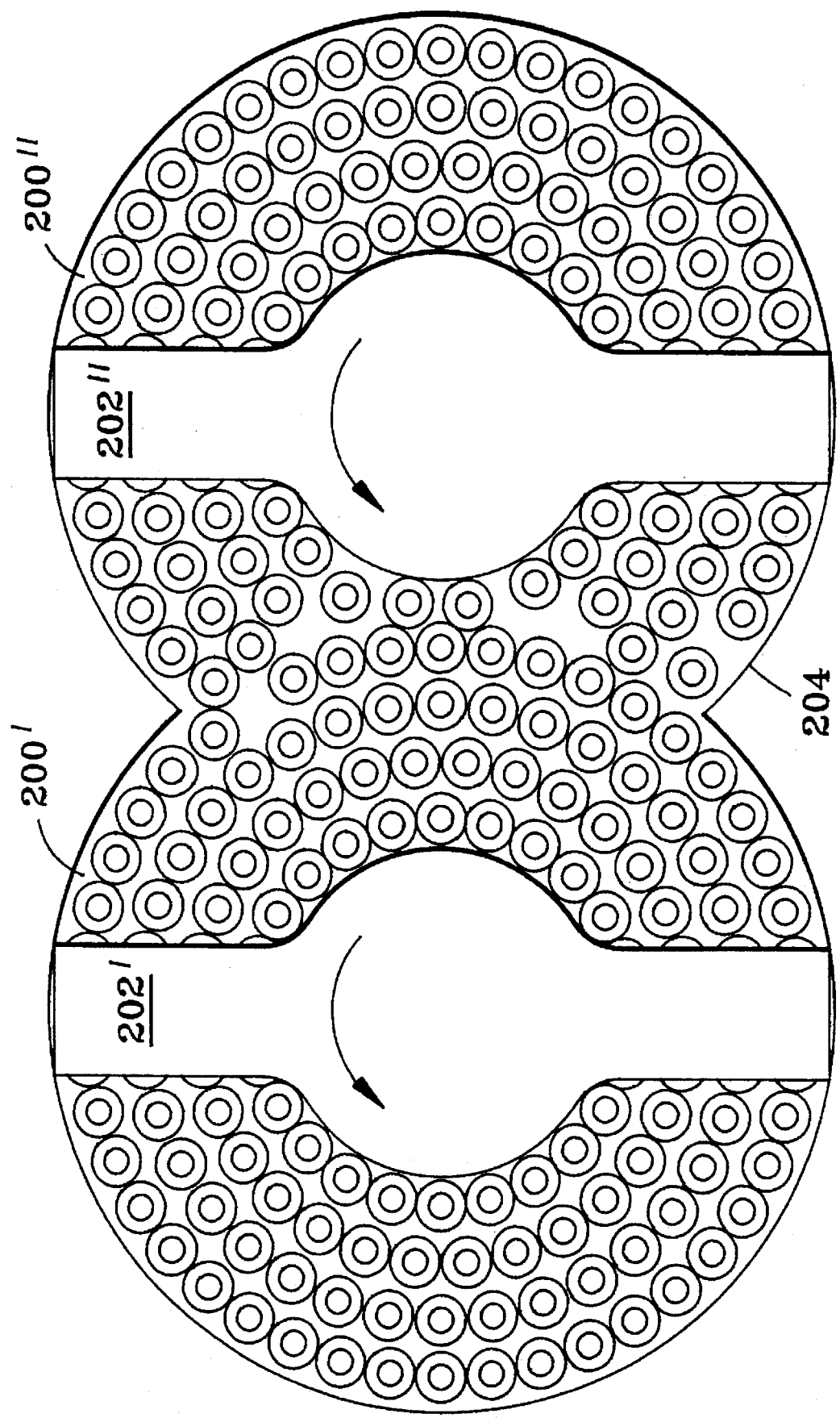

FIG. 16 shows a double screw extruder. A spatula element 202', 202" glides over each of the matrix of holes 200', 200". The bearing is located in a common housing 204. The advantage in this design is the shorter construction, which can be thus made more simple and more economical. Complicated kneading and homogenising elements can thus be dispensed with. As in the single screw machines the homogenising is improved, the shear and heat distribution made more uniform, an improved wear behaviour is observed; the controllability is increased.

In general thus as per the invention, suspensions, kneaded masses, pastes and doughs can be transported through matrices of holes with the help of an arm gliding over the matrix of holes. Transportation occurs because of the increased pressure on the front end (in direction of movement) of the gliding arm. The extent of the pressure is dependant on the shape of the gliding arm (rod, positioned spatula etc.) and the distance of the arm from the matrix of holes. The design must be so chosen, that the pressure in front of the gliding arm is sufficient to overcome the pressure loss through the matrix holes. The advantages of the gliding arm as compared to pressure build up purely with the help of a screw lies in:

1. The local pressure increase at few holes.

2. The spatula-pump assumes special importance when (as in many pastes) flow behaviour depending on shear intensity and shear rate (structure-viscous behaviour) is to be expected.

Intensive mixing and shear movement before the spatula reduce the inertia of the paste and thus requires only a small pressure loss in the passage through the holes.

The "fluidisation" of the paste can be an internal characteristic of the material (intrinsic structure-viscosity). In case of water containing suspensions and doughs these phenomena can also be expected when the condition parameters (pressure/ temperature) find themselves close to the boiling point.

a. If the condition parameters correspond to the boiling point, then the water is available in part in the form of steam. The dough then forms a foam with relatively high viscosity. On being compressed by the gliding arm, the water condensates, the dough becomes fluid and allows itself to be pushed through the holes at high throughput. After the passage the dough hardens, backflow to the leeward side of the gliding arm is thereby avoided. Thus, it is also possible to transport against relatively high back pressure.

b. If the condition parameters are slightly below the boiling point then the water is fluid (no foam).

By the processing on the high pressure side, energy is input (elastic pressure energy and dissipated shear energy). The dissipated shear energy leads to a local temperature increase. On the leeward side there is a low pressure, which leads to evaporation of a part of the fluid and thereby the foam formation in dough. With the cooling or by pressure increase the water vapour condenses (cavitation).

3. Under the abovementioned conditions the equipment has the function of a pump and can thus build up an increased pressure by multistage arrangement. In multistage arrangement an "asymmetry" must be ensured with reference to the pump effect. i.e. the pumps must indicate a "transport direction". This transport direction can be ensured, for one, through the setting angle in direction of transport, for others, through different distances of the gliding arm to the lower and upper plate-with-holes or through different surface characteristics (friction). Under complete geometrical symmetry and same friction behaviour, to the spatula-pump must be superposed an external pressure. The "spatula-pump" acts in this case only as a "liquefier".

The objectives met by the measures in accordance with this invention or the advantages can be summarised as follows:

upto 100% higher capacity better product quality through more uniform flow and uniform texture excellent process control possibilities very easy handling of the parts economical tools significant reduction of wear part costs insensitivity to raw material variations significantly higher freedom in the recipe compositions better entry behaviour of raw materials in powder form By the measures in accordance with the invention even existing, "worn out" screw extruders, resp. extruder screws, can be equipped again and their life-time can be thereby significantly increased.

EXAMPLE

Four flight screw of known design with usual screw profile is extended at the head by an adaptor which passes through the first pressure plate, which is located as usual in front of the spatula shape screw head surface and is used to mount the spatula element. This glides over the second pressure plate and forms thereby the second spatula-stage. The usual nozzle plates complete the system. Both the pressure plates form a spatula chamber in which the spatula element rotates. The spatula element of circular cross section is only slightly thinner than the spatula space formed by the two pressure plates. The pressure relationship can be specifically influenced by the thickness of the pressure plates and the number and size of the holes. The type of the conical widening of the holes towards spatula element influences the adhesion / friction of the mass on the surface of the plate of holes and thereby their transport characteristics.

If one realises here the measures in accordance with the invention, then one can achieve excellent results with used screws, whereby the gap between the screw and sleeve is approximately 1.6 mm. If one sets the spatula element in movement then this would create a zone of higher pressure in front of the spatula element in the direction of rotation and a zone of lower pressure behind the spatula element seen from the direction of rotation. Now if the dough has a temperature of 140 degrees C in a zone of lower pressure and the pressure there is below 3.5 bars then the water evaporates and the dough increases its volume. In this condition (a mixture of steam bubbles and fluids) the dough has a significantly higher viscosity as compared to pure fluid form. Thus it presents a higher resistance to the nearing spatula, whereby pressure is built up, the water condenses and the condensation energy again heats up the dough etc. The continuous change between high pressure and low pressure caused by the spatula element below the boiling point of water or the fluid, causes an enormous homogenising effect in the dough and an extremely effective energy exchange thus preventing partial overheating and forms most probably the main basis for the surprisingly good pumping behaviour of the spatula-stage. Due to the continuously occuring expansion and compression one after the other, the heat transport within the system is significantly improved and finally the flow properties of the biopolymer dough are positively influenced. In order to not overload the application, many subclaims have been associated only to certain main claims. Naturally, such preferred embodiments, wherever technically feasible, are also thought to be set up in the form of subclaims to most other main claims.

I claim:

1. A cooker-extruder for the production of thermally treated bio-polymers, comprising:
   an extrusion cylinder having an exit end;
   a feeding hopper attached to said extrusion cylinder;
   at least one conveying screw, said screw disposed within said extrusion cylinder;
   an exit nozzle attached to said exit end of said extrusion cylinder; and
   at least one spatula-pump disposed within said extrusion cylinder and arranged between said feeding hopper and said nozzle, each spatula pump comprising a plate with a matrix of holes and at least one spatula element, each spatula element being passable over said plate with a matrix of holes.

2. The cooker-extruder according to claim 1 wherein an angle between each spatula element and said plate with a matrix of holes is between about 0 degrees and 90 degrees.

3. The cooker-extruder according to claim 1 wherein said at least one conveying screw has an exit end, said exit end being towards said exit nozzle, further comprising:
   a head surface on the exit end of each conveying screw, said head surface being substantially wedge shaped.

4. The cooker-extruder according to claim 3 wherein said head surface is shaped at an angle of less than about 90 degrees.

5. The cooker-extruder according to claim 1 wherein said at least one conveying screw has a longitudinal axis further comprising a drive shaft extending from each conveying screw toward said exit nozzle, each spatula element being connected to said drive shaft and being substantially perpendicular to said longitudinal axis of each conveying screw.

6. The cooker-extruder according to claim 1 wherein said plate with a matrix of holes has at least one channel therein to facilitate the circulation of fluids for temperature regulation of said plate.

7. The cooker-extruder according to claim 1 further comprising a screw-plate with a matrix of holes, said screw plate being disposed within said extrusion cylinder and located between each conveying screw and each spatula pump.

8. The cooker-extruder according to claim 5 wherein each spatula element has a longitudinal axis and wherein each spatula element being rotatable about said longitudinal axis of said spatula element.

9. The cooker-extruder according to claim 8 wherein said spatula element has a round cross section and is substantially conically shaped, each spatula element having a diameter which decreases with distance from said drive shaft.

10. The cooker-extruder according to claim 1 wherein said plate with a matrix of holes further comprises at least one of said holes being substantially conically shaped and widening in the direction of the flow of said material to be extruded.

11. The cooker-extruder according to claim 1 wherein each spatula pumps is serially disposed within said extrusion cylinder.

12. A cooker-extruder for the production of thermally treated bio-polymers, comprising:
   an extrusion cylinder having an exit end;
   a feeding hopper attached to said extrusion cylinder;
   an exit nozzle attached to said exit end of said extrusion cylinder; and
   a plurality of spatula-pumps disposed within said extrusion cylinder and arranged between said feeding hopper and said nozzle, each said spatula pump comprising a plate with a matrix of holes and at least one spatula element, said spatula element being passable over said plate with a matrix of holes, said plurality of spatula-pumps being serially oriented with respect each other.

13. The cooker-extruder according to claim 1 further comprising two conveying screws, each disposed within said extrusion cylinder.

14. A process for cooking extrusion of biopolymers comprising:
   placing a biopolymeric material to be extruded in a cooker extruder having a screw, and at least one spatula pump, said spatula pump comprising a plate with a matrix of holes and at least one spatula element, said spatula element being passable over said plate with a matrix of holes; extruding the biopolymeric material through the cooker-extruder; and
   passing said spatula element over said plate with a matrix of holes to cause a pressure increase and thus a liquefaction of fluid vapor generated from said biopolymeric material in front of said passing spatula element and to cause a decrease in pressure behind said passing spatula element, thereby allowing an evaporation of the fluid contained in the biopolymeric material.

15. The process for cooking extrusion of biopolymers according to claim 14 further comprising:
   compressing said material to be extruded into a fluid mass by subjecting said material to a pressure after said material has passed through spatula pump.

16. The process for cooking extrusion of biopolymers according to claim 14 wherein said screw has an end, further comprising:

operating said extruder such that the ratio of the pressure at said end of said screw and the pressure behind said passing spatula element is about 10:1.

17. The process for cooking extrusion of biopolymers according to claim 14, wherein said extruder includes a plurality of spatula pumps, further comprising setting said material in an oscillating motion between at least two of said plurality of spatula pumps by passing said spatula element over said plate with a matrix of holes.

18. The process for cooking extrusion of biopolymers according to claim 14 further comprising the step of flowing the biopolymeric material at a mass flow rate of about 200 kg/hr to about 350 kg/hr, thereby resulting in a residence time of from about 2 seconds to about 4 seconds.

19. The process for cooking extrusion of biopolymers according to claim 14 wherein said spatula element has a diameter larger diameter than a diameter said screw.

* * * * *